US012529786B2

(12) United States Patent
Lee

(10) Patent No.: US 12,529,786 B2
(45) Date of Patent: Jan. 20, 2026

(54) POWER SAVING FOR DIGITAL RADAR

(71) Applicant: Aura Intelligent Systems, Inc., Boston, MA (US)

(72) Inventor: Jungah Lee, Boston, MA (US)

(73) Assignee: Aura Intelligent Systems, Inc., Boston, MA (US)

( * ) Notice: Subject to any disclaimer, the term of this patent is extended or adjusted under 35 U.S.C. 154(b) by 524 days.

(21) Appl. No.: 17/628,192

(22) PCT Filed: Jul. 17, 2020

(86) PCT No.: PCT/US2020/070296
§ 371 (c)(1),
(2) Date: Jan. 18, 2022

(87) PCT Pub. No.: WO2021/011967
PCT Pub. Date: Jan. 21, 2021

(65) Prior Publication Data
US 2022/0260709 A1 Aug. 18, 2022

Related U.S. Application Data

(60) Provisional application No. 62/875,821, filed on Jul. 18, 2019.

(51) Int. Cl.
*G01S 13/931* (2020.01)
*G01S 7/00* (2006.01)
(Continued)

(52) U.S. Cl.
CPC ............ *G01S 13/931* (2013.01); *G01S 7/003* (2013.01); *G01S 7/023* (2013.01); *G01S 13/288* (2013.01);
(Continued)

(58) Field of Classification Search
CPC ........ G01S 13/931; G01S 7/003; G01S 7/023; G01S 13/288; G01S 13/582; G01S 2013/9316; G01S 13/42; G01S 7/006
See application file for complete search history.

(56) References Cited

U.S. PATENT DOCUMENTS

2004/0025182 A1 2/2004 Tari et al.
2005/0025182 A1 2/2005 Nazari
(Continued)

FOREIGN PATENT DOCUMENTS

CN 101754345 A 6/2010
CN 104486830 A 4/2015
(Continued)

OTHER PUBLICATIONS

Extended European Search Report issued Jun. 29, 2023 regarding Application No. 20840771.8, 10 pages.
(Continued)

*Primary Examiner* — William Kelleher
*Assistant Examiner* — Kenneth W Good

(57) ABSTRACT

The apparatus includes: a radar circuit including a set of transmit antennas and a set of receive antennas; and a controller operably connected to the radar circuit, including a MAC controller and a configuration circuit, the controller configured to: in response to reporting a device capability including a maximum power and a power back off, identify a measurement configuration including a measurement gap, a set of parameters, and a sub-band structure; identify, based on the measurement configuration, a power control configuration for the radar circuit; and identify, based on a measurement report corresponding to the power control configuration, a power control mode including at least one of a normal mode, a low power mode, or an idle mode, wherein the radar circuit is configured to transmit a first signal at a
(Continued)

transmit power that is determined based on the measurement report and the power control mode.

18 Claims, 9 Drawing Sheets

(51) Int. Cl.
  *G01S 7/02* (2006.01)
  *G01S 13/28* (2006.01)
  *G01S 13/58* (2006.01)
(52) U.S. Cl.
  CPC ..... *G01S 13/582* (2013.01); *G01S 2013/9316* (2020.01)

(56) References Cited

U.S. PATENT DOCUMENTS

| | | | |
|---|---|---|---|
| 2005/0032524 A1 | 2/2005 | Kruys et al. | |
| 2006/0071790 A1* | 4/2006 | Duron | G06K 17/00 |
| | | | 340/572.1 |
| 2009/0067354 A1 | 3/2009 | Gao et al. | |
| 2011/0159912 A1 | 6/2011 | Zong | |
| 2013/0322279 A1 | 12/2013 | Chincholi et al. | |
| 2014/0220905 A1 | 8/2014 | Buckley et al. | |
| 2014/0269461 A1 | 9/2014 | Mehta | |
| 2014/0313953 A1 | 10/2014 | Zhang et al. | |
| 2015/0080047 A1 | 3/2015 | Russell et al. | |
| 2015/0331093 A1 | 11/2015 | Pandharipande et al. | |
| 2017/0052276 A1 | 2/2017 | Connor | |
| 2017/0160381 A1* | 6/2017 | Cho | G01S 7/4004 |
| 2017/0251484 A1* | 8/2017 | Negus | H04L 5/0073 |
| 2017/0288766 A1* | 10/2017 | Cook | H04B 7/15535 |
| 2018/0115409 A1 | 4/2018 | Nayyar et al. | |
| 2018/0184383 A1* | 6/2018 | Reddy | H04W 52/243 |
| 2018/0217230 A1* | 8/2018 | Martone | G01S 7/4008 |
| 2018/0234996 A1* | 8/2018 | Khoury | H04W 72/1263 |
| 2018/0329049 A1* | 11/2018 | Amihood | G01S 13/88 |
| 2020/0166623 A1* | 5/2020 | Sahin | G01S 7/006 |
| 2020/0355535 A1* | 11/2020 | Welle | G01F 23/284 |
| 2022/0217654 A1* | 7/2022 | Kang | H04W 52/346 |
| 2022/0264481 A1* | 8/2022 | Caporal Del Barrio | |
| | | | H04W 52/367 |

FOREIGN PATENT DOCUMENTS

| | | |
|---|---|---|
| JP | 2009523360 A | 6/2009 |
| JP | 2013195156 A | 9/2013 |
| JP | 2013221893 A | 10/2013 |
| JP | 2016507728 A | 3/2016 |
| JP | 2020513539 A | 5/2020 |
| KR | 101853156 B1 | 4/2018 |
| WO | 2020259852 A1 | 12/2020 |

OTHER PUBLICATIONS

Chinese National Intellectual Property Administration, First Office Action issued Jul. 24, 2023 regarding Application No. 202080065461.0, 9 pages.
International Search Report and Written Opinion issued Sep. 30, 2020 regarding International Application No. PCT/US2020/070296, 8 pages.
Japanese Patent Office, Office Action issued May 27, 2025 regarding Application No. 2022503574, 8 pages.
Korean Intellectual Property Office, Office Action issued Aug. 21, 2025 regarding Application No. 10-2022-7005413, 12 pages.

* cited by examiner

POWER SAVING FOR DIGITAL RADAR

CROSS-REFERENCE TO RELATED APPLICATIONS AND CLAIM OF PRIORITY

This application is a 371 National Stage Application of International Application No. PCT/US2020/070296 filed on Jul. 17, 2020, which claims priority to U.S. Provisional Patent Application No. 62/875,821, filed on Jul. 18, 2019, the disclosures of which are herein incorporated by reference in their entirety.

TECHNICAL FIELD

This disclosure generally relates to a power saving scheme. More specifically, this disclosure relates to a power saving operation for a radar system.

BACKGROUND

Radars based on digital and/or analog waveforms and a signal processing is emerging in commercial high-resolution radar applications. This trend is spurred by high-performance requirements and interference challenges that arise in automotive safety and autonomous driving, infrastructure and industrial applications. Mission critical applications require robust performance in the presence of many vehicle radars and harmful jamming signal. High-resolution imaging radars require wide-bandwidth analog-to-digital convert (ADC) to convert the signal to digital domain. In addition, large number of channels is required for imaging radar, which further increases the cost and power consumption of the device.

SUMMARY

This disclosure provides a power saving operation for a radar.

In one embodiment, an apparatus of an advanced wireless system is provided. The apparatus comprises a radar circuit including a set of transmit antennas and a set of receive antennas. The apparatus of the advanced wireless system further includes a controller operably connected to the radar circuit, including a medium access control (MAC) controller and a configuration circuit, the controller configured to: in response to reporting a device capability including a maximum power and a power back off, identify a measurement configuration including a measurement gap, a set of parameters, and a sub-band structure; identify, based on the measurement configuration, a power control configuration for the radar circuit; and identify, based on a measurement report corresponding to the power control configuration, a power control mode including at least one of a normal mode, a low power mode, or an idle mode. The radar circuit of the apparatus of the advanced wireless system is configured to transmit a first signal at a transmit power that is determined based on the measurement report and the power control mode.

In another embodiment, a method of an advanced wireless system is provided. The method comprises: in response to reporting a device capability including a maximum power and a power back off, identifying a measurement configuration including a measurement gap, a set of parameters, and a sub-band structure; identifying, based on the measurement configuration, a power control configuration for a radar circuit; identifying, based on a measurement report corresponding to the power control configuration, a power control mode including at least one of a normal mode, a low power mode, or an idle mode; and transmitting a first signal at a transmit power that is determined based on the measurement report and the power control mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 13, described below, and the various embodiments used to describe the principles of the present disclosure in this patent document are by way of illustration only and should not be construed in any way to limit the scope of the present disclosure. Those skilled in the art will understand that the principles of the present disclosure may be implemented in any type of suitably arranged device or system.

Figure 1:
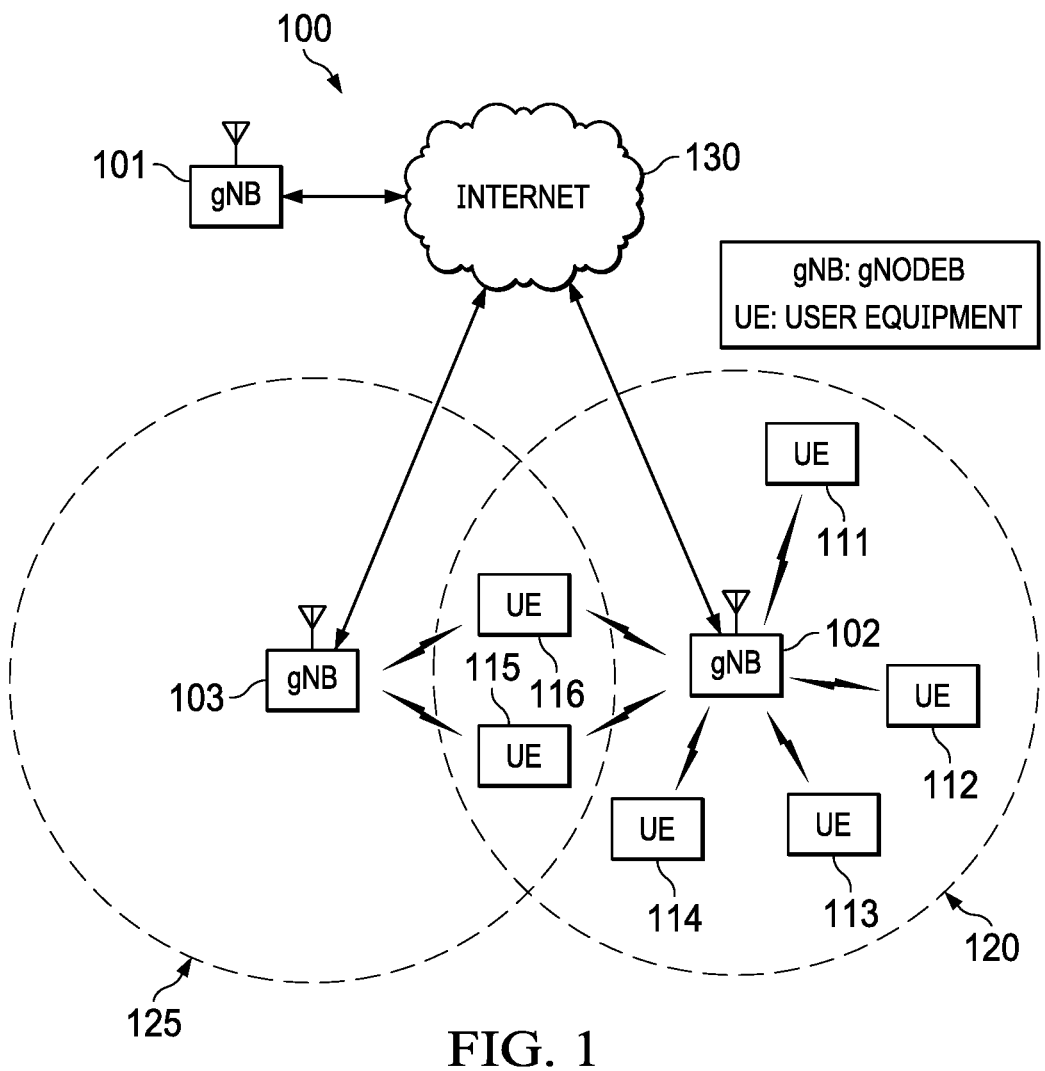
FIG. 1 illustrates an example wireless network according to embodiments of the present disclosure.
Figure 2:
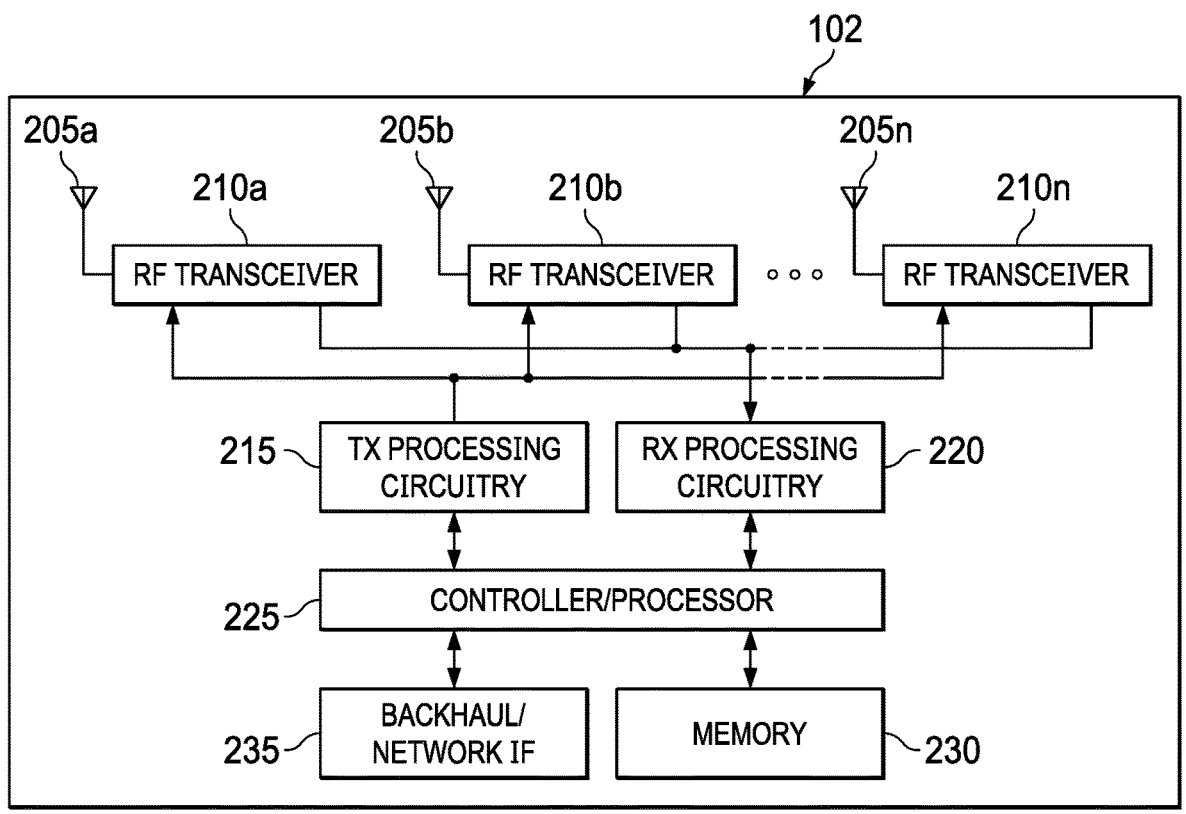
FIG. 2 illustrates an example gNB according to embodiments of the present disclosure.
Figure 3:
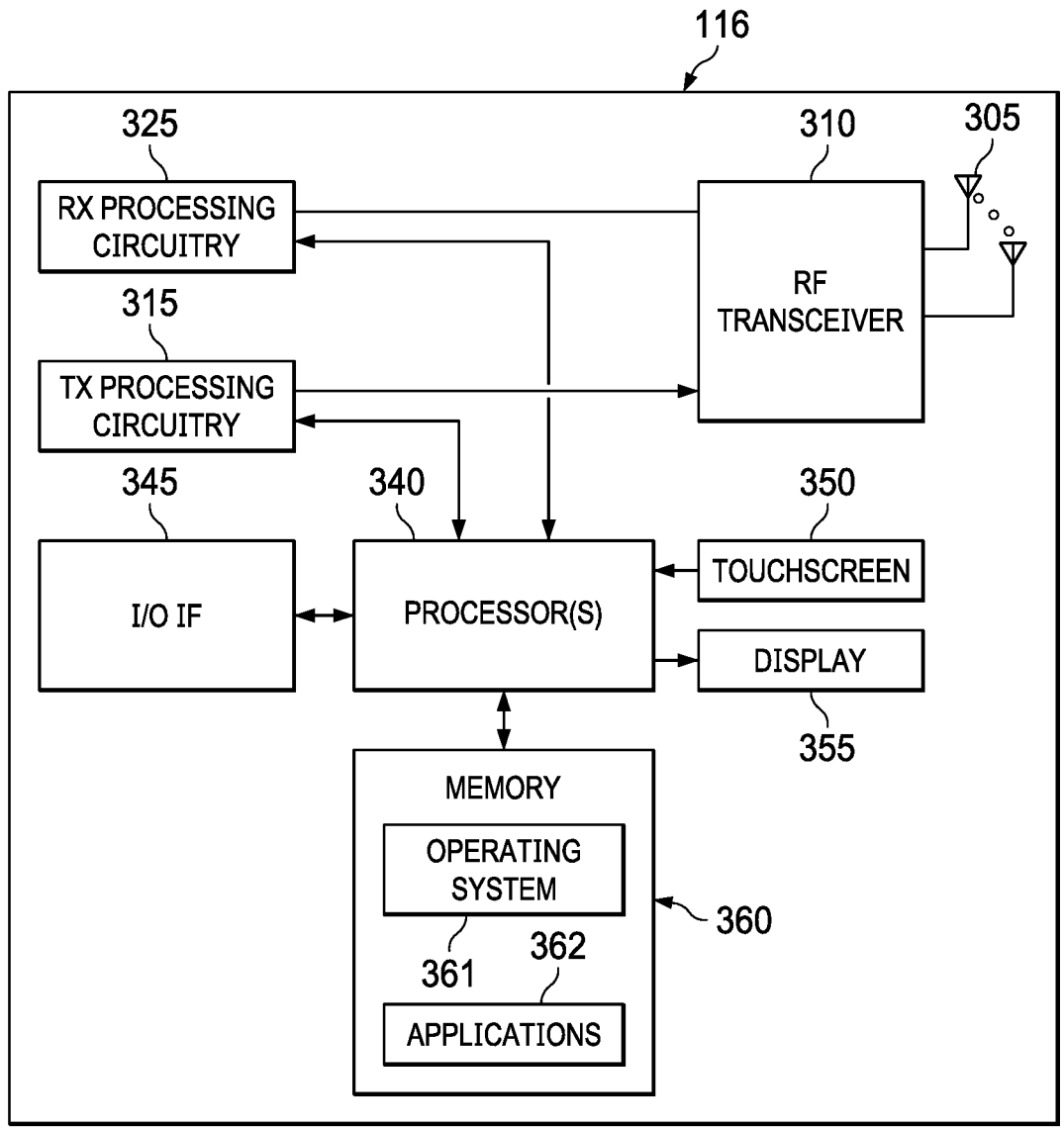
FIG. 3 illustrates an example UE according to embodiments of the present disclosure.

FIGS. 1 through 3 describe various embodiments implemented in wireless communications systems and with the use of orthogonal frequency division multiplexing (OFDM) or orthogonal frequency division multiple access (OFDMA) communication techniques. FIGS. 1 through 3 may employ radar technologies including a digital radar, an analog radar, or a hybrid radar, or their related functionalities or operations. The descriptions of FIGS. 1 through 3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a g NodeB (gNB) 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient synthetic aperture antenna array design and beamforming for 3D imaging, localization, and positioning in an advanced wireless system.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 4:
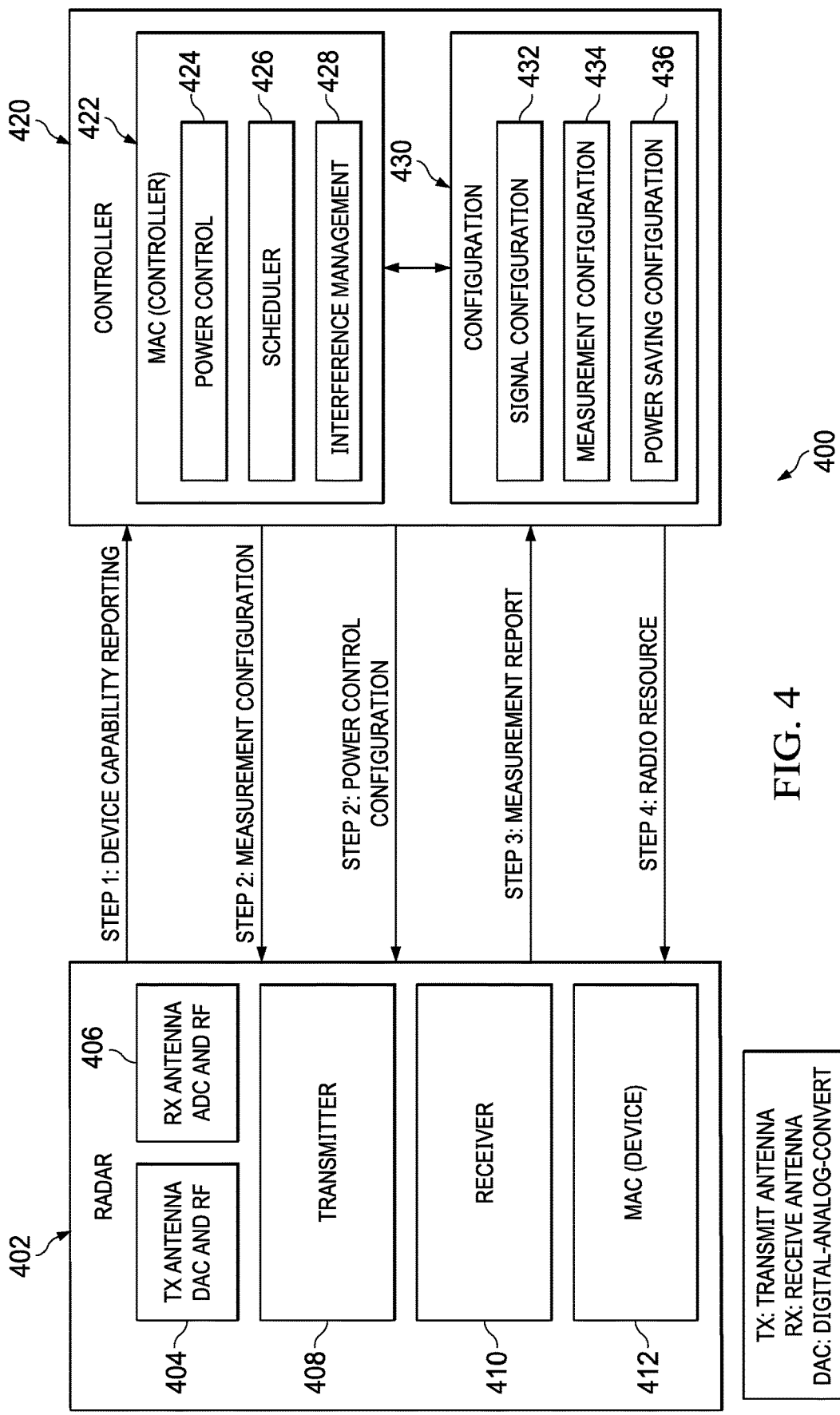
FIG. 4 illustrates an example radar system device and controller architecture according to embodiment of the present disclosure.
Figure 5:
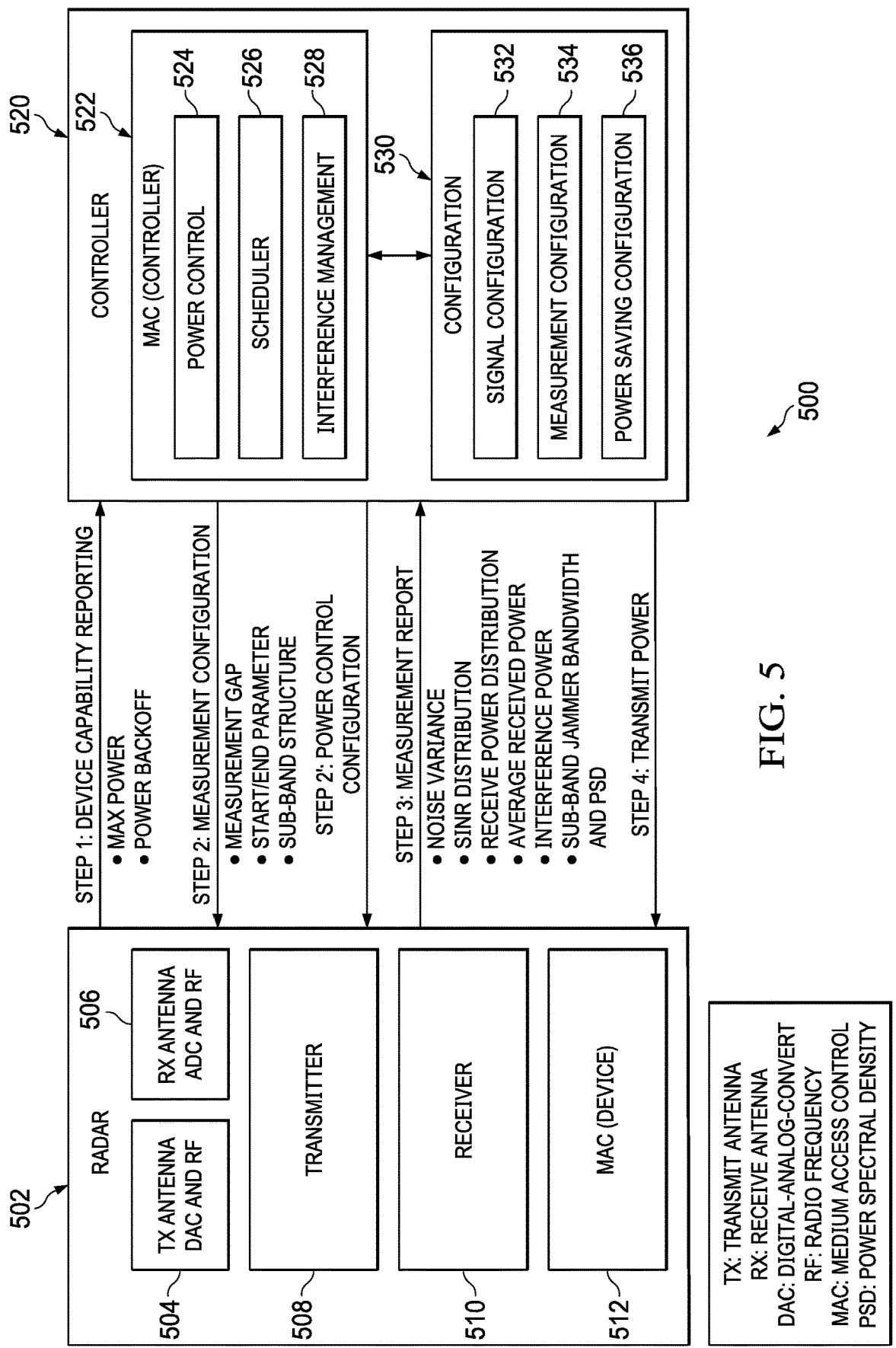
FIG. 5 illustrates an example radar system power control mechanism according to embodiments of the present disclosure.

As illustrated in FIG. 1, the gNB 101, 102, and 103 may employ a radar system, as shown in FIGS. 4 and 5, as one of communication parts (e.g., circuit, module, interface, function etc.) according to embodiment of the present disclosure. In addition, the UE 111 to 116 may employ a radar system including a digital radar system, an analog radar system, or a hybrid radar system, as shown in FIGS. 4 and 5, as one of communication parts (e.g., circuit, module, interface, function etc.) according to embodiment of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The RF transceivers 210a-210n receive, from the antennas 205a-205n, incoming RF signals, such as signals reflected by UEs or any other objects in the network 100. The RF transceivers 210a-210n down-convert the incoming RF signals to generate IF or baseband signals. The IF or baseband signals are sent to the RX processing circuitry 220, which generates processed baseband signals by filtering, decoding, digitizing the baseband or IF signals and/or decompressing or correlating. The RX processing circuitry 220 sends the processed baseband signals to the controller/processor 225 for further processing.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, the ground station (e.g., access point) could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

As illustrated in FIG. 2, the gNB 102 may include a radar system as illustrated in FIGS. 4 and 5. The processor 340 may include 420, 520 as illustrated in FIGS. 4 and 5 to control the radar 402, 502 or controller 420, 520 as illustrated in FIGS. 4 and 5 may be implemented independently and coexist with the controller 225 as illustrated in FIG. 2, in order to control the radar 402 as illustrated in FIG. 4 and the radar 506 as illustrated in FIG. 5.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

An advanced communication apparatus may refer to a transmitter or receiver array in FIGS. 2 and 3 providing hybrid beamforming operation based on all functional blocks, and may be implemented in FIG. 2 as a part of a base station (BS, gNB) or FIG. 3 as a UE.

As shown in FIG. 3, the UE 116 includes an antenna 305, a radio frequency (RF) transceiver 310, TX processing circuitry 315, and receive (RX) processing circuitry 325.

The UE 116 also includes a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal and/or decompressing or correlating. The RX processing circuitry 325 transmits the processed baseband signal to the processor 340 for further processing (such as for web browsing data).

The TX processing circuitry 315 receives outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

As illustrated in FIG. 3, the UE 116 may include a radar system as illustrated in FIGS. 4 and 5. The processor 340 may include 420, 520 as illustrated in FIGS. 4 and 5 to control the radar 402, 502 or controller 420, 520 as illustrated in FIGS. 4 and 5 may be implemented independently and coexist with the processor 340 as illustrated in FIG. 3, in order to control the radar 402, 502.

The present disclosure provides power saving schemes for a radar system. Following two power saving modes may be provided. In one embodiment, a power control is provided. In such embodiment, an adaptive power setting is provided based on measurement and estimation of noise power, target range and/or path loss. In another embodiment, an idle mode is provided. In such embodiment, an operation with blanking or partial blanking of symbol/sub-carrier/slot/sub-frame for reduced power operation is provided (e.g., blank formats).

In another embodiment, a measurement configuration is introduced for wideband and sub-band measurements. In yet another embodiment, further enhancement of power control aided by vehicle to everything (V2X) is introduced to improve power control accuracy.

Radars based on digital waveform and/or analog waveforms and signal processing is emerging in commercial high-resolution radar applications. This trend is spurred by high-performance requirement and interference challenge that arises in automotive safety and autonomous driving, infrastructure and industrial applications. Mission critical applications require robust performance in the presence of many vehicle radars & harmful jamming signal.

High-resolution imaging radars require wide-bandwidth analog-to-digital converting (ADC) to convert the signal to a digital domain. In addition, large number of channels is required for an imaging radar, which further increases the cost and power consumption.

A digital waveform of the present disclosure includes low-peak to average power ratio (PAPR) and interference/jammer suppression capability, improving the power amplifier (PA) efficiency compared with generic OFDM waveform. A beamforming antenna of the present disclosure reduces transmit power while providing sufficient link-budget for long-range operation.

In the present disclosure, it is provided that power control and a set of power saving modes drastically reduce the power consumption by lowering average transmit power and blanking.

In the present disclosure, there may be three modes of operation. In one example of a normal mode, radar uses constant power transmission with peak transmit power often. In another example of a low power mode, transmit power less than peak transmit power is used, based on a power control algorithm, taking into account maximum range, path loss estimate for the targeted range and/or noise and interference estimation. In yet another example of idle mode, blanking of certain symbols/slots/sub-carriers or beams is provided, resulting in additional power savings.

A power saving mode (e.g., power control mode) can be effective one time (e.g., one-time control mode), configured periodically (e.g., periodic control mode) or configured with timer (e.g., a pre-determined time period control mode).

A power control sets the transmit power of the radar transmitter. The power is determined adaptively depending on the system configuration, receiver processing including processing gain, multi-input multi-output (MIMO)/beamforming mode, background noise and clutter measurement and interference and jamming signals.

In order to minimize the interference and maximize the capacity, a transmit power is set to a minimum level while satisfying the required performance. Often, a constant false alarm rate (CFAR) detector is employed, where a detection threshold is determined by the required probability of false alarm. Target detection performance depends on the post-detection signal-to-interference rate (SINR) target. The SINR target is the minimum SINR value that satisfies the detection performance target. Power control allows a device to reduce power consumption significantly by avoiding peak-power.

Transmit power depends on the target transmit power and the noise variance as given by:

$$P_{TX,Target} = PL \times \frac{1}{PG} \sigma_N^2 \times 10^{SIRTarget\_dB/10}$$

where PG denotes the processing gain of the receiver, SIRTarget_dB denotes the target SIR in dB, and PL is the two-way path loss between the radar module and the target.

For a system with max transmit power $P_{TX,Max}$, transmit power is set to $P_{TX}=\min(P_{TX,Max}, P_{TX,Target})$.

In one embodiment, transmit power is set adaptively by a power control algorithm based on the at least one of following configuration parameters and measurement results: a beamforming/MIMO mode; a power saving mode; SIR target SIRTarget_dB; maximum propagation loss depending on targeted range and propagation environment; maximum transmit power; a receiver processing gain; a power offset (additional margin) to account for PA-backoff, fading channel; noise variance estimation error; interference and jammer; and any imperfection in the transmitter/receiver behavior.

In one embodiment, architecture for power saving is provided. In one example, the architecture includes a medium access control (MAC) controller comprising a configuration of waveform parameters (e.g., setting blank patterns (formats)); a power management configuration and power control algorithm; interference management; a scheduler; and a measurement configuration. In another example, the architecture includes a transmitter comprising waveform generation & RF according to configuration. In yet another example, the architecture comprises a receiver including a Rx processing circuit; and a measurement circuit.

FIG. 4 illustrates an example radar system device and controller architecture 400 according to embodiment of the present disclosure. The embodiment of the radar system device and controller architecture 400 illustrated in FIG. 4 is for illustration only. FIG. 4 does not limit the scope of this disclosure to any particular implementation.

As illustrated in FIG. 4, the radar system device and controller 400 include a radar 402 and a controller 420. The radar 402 includes a TX antenna digital to analog convert (DAC) and radio frequency (RF) 404, an RX antenna analog-digital convert (ADC) and RF 406, a transmitter 408, a receiver 410, and a MAC 412. In addition, the controller 420 includes a MAC entity 422 and a configuration entity 430. The MAC (e.g., MAC controller) 422 includes a power control circuit 424, a scheduler 426 performing a scheduling operation, and interference management 428. The configuration 430 includes a signal configuration circuit 432, a measurement configuration circuit 434 performing a measurement configuration, and a power saving configuration circuit 436.

As illustrated in FIG. 4, the controller 420 includes a configuration entity 430 and the MAC entity 422. The configuration entity 430 is responsible for a setting signal configuration, a measurement configuration, and a power saving configuration. The MAC entity 422 insides the controller is responsible for dynamically managing radio resources and comprises a power control, a scheduler, and an interference management circuits (e.g., modules).

The MAC entity 422 in a radar circuit (e.g. module) determines the transmit power setting in a transceiver of the radar circuit.

In one embodiment of step 1, device capability such as transmit power and maximum RF bandwidth is reported from the radar (e.g., the radar 402) to the controller 420.

In another embodiment of step 2, a measurement configuration is sent from the controller 420 to the radar (e.g., the radar 402) for such as noise and interference measurements.

In yet another embodiment of step 3, measurement is reported from the radar (e.g., the radar 402) to the controller 420 in a periodic or aperiodic manner.

In yet another embodiment of step 4, radio resources such as power, time symbol/slot/frame, and frequency resource are determined in power control, scheduler and interference management entities (e.g., 428) in the MAC 422 residing in the controller 420. Based on the radio resource, radar constructs the signal structure for transmission.

As illustrated in FIG. 4, the radar 402 transmits a device capability reporting to a controller 420 in step 1. In step 2, the controller 420 transmits a measurement configuration to the radar 402. In step 2', the controller 420 transmits a power control configuration to the radar 402. In step 3, the radar 402 transmits a measurement report to the controller 420. In step 4, the controller 420 transmits information for radio resources.

FIG. 5 illustrates an example radar system power control mechanism 500 according to embodiments of the present disclosure. The embodiment of the radar system power control mechanism 500 illustrated in FIG. 5 is for illustration only. FIG. 5 does not limit the scope of this disclosure to any particular implementation.

As illustrated in FIG. 5, the radar system power control mechanism 500 includes a radar 502 and a controller 520. The radar 502 includes a Tx antenna (digital to analog convert) DAC and radio frequency (RF) 504, an Rx antenna analog-digital convert (ADC) and RF 506, a transmitter 508, a receiver 510, and a MAC (device) 512. In addition, the controller 520 includes a MAC (controller) entity 522 and a configuration entity 530. The MAC (controller) 522 includes a power control circuit 524, a scheduler 526, and interference management 528. The configuration entity 530 includes a signal configuration circuit 532, a measurement configuration circuit 534, and a power saving configuration circuit 536.

As illustrated in FIG. 5, the radar 502 transmits a device capability reporting to a controller 520 in step 1. The device capability reporting includes maximum power and a power back-off. In step 2, the controller 520 transmits a measurement configuration to the radar 502. The measurement configuration includes measurement gap, a start/end parameter, and a sub-band structure. In step 2', the controller 520 transmits a power control configuration to the radar 502. The measurement report includes a noise variation, an SINR distribution, a receive power distribution, an average received power, sub-band jammer bandwidth and power spectral density (PSD), and a transmit power.

In step 3, the radar 502 transmits a measurement report to the controller 520. In step 4, the controller 520 transmits information for radio resources.

In one embodiment of controller-based power control, there may be several examples.

In one example of a device capability reporting, the device capabilities such as maximum transmit power, power backoff, and antenna configuration are reported to the controller entity 520.

In one example of a measurement configuration (e.g., 534 as illustrated in FIG. 5), a set measurement gap configuration includes: symbol/slot/frame or sub-channel structure; start/end timer; and periodicity and duration.

In one example of a measurement reporting, noise variance $\sigma_N^2$ is estimated from the received signal at the radar module and reported to the controller 520; and for measurement, a gap in transmission may be introduced optionally for the receiver to measure the noise variance and interference level.

In one example of MAC power control (e.g., at controller 520), a power control algorithm (e.g., wideband power control) calculates target transmit power and sends the target transmit power to radar module (e.g., the radar 502 as illustrated in FIG. 5) as given by:

$$P_{TX,Target} = PL \times \frac{1}{PG} \sigma_N^2 \times 10^{SIR_{Target\_dB}/10}.$$

In such embodiment, additional margin may be added due to noise estimation error, interference and jammer.

In one example of MAC power control (e.g., at radar module such as the radar 502 as illustrated in FIG. 5), transmit power is determined as $P_{TX}=\min(P_{TX,Max}, P_{TX,Target})$ where $P_{TX,Max}$ is the maximum transmit power of the radar module.

In one embodiment of device-based power control, a power control algorithm can be implemented at the radar module. In this case, optionally in Step 2' of FIG. 5, the controller 520 sends power control configuration parameters to a radar circuit (e.g., module such as the radar 502 as illustrated in FIG. 5).

In one embodiment of a power control configuration, power control configuration parameters are set: post-detection target SIR SIRTarget_dB; maximum two-way path loss corresponding to the maximum target range; a processing gain for receiver; and a transmit power margin.

In one embodiment of MAC power control (e.g., at radar circuit/module such as the radar 502 as illustrated in FIG. 5), a power control algorithm calculates target transmit power and sends the target transmit power to the radar module (e.g., the radar 502) as given by:

$$P_{TX,Target} = PL \times \frac{1}{PG} \sigma_N^2 \times 10^{SIR_{Target\_dB}/10}.$$

In such embodiment, an additional margin may be added due to noise estimation error, interference and jammer. In such embodiment, the transmit power is determined as $P_{TX}=\min(P_{TX,Max}, P_{TX,Target})$ where $P_{TX,Max}$ is the maximum transmit power of the radar module.

In one embodiment of sub-band power control, for a sub-band waveform, transmit power can be set differently for each sub-band. Target transmit power for sub-band b is calculated as $$P_{TX,Target,b} = \frac{1}{PG_b} \sigma_{N,b}^2 \times 10^{SIR_{Target_{db},b}/10}$$

where PG denotes the processing gain by coherent integration of the signal for sub-band b, SIRTarget_dB,b denotes the STR target for sub-band b, and $\sigma_{N,b}^2$ denotes the noise variance of sub-band b. For a system with max transmit power per sub-band b, denoted as $P_{TX,Max,b}$, transmit power of sub-band signal is set as $P_{TX,b}=\min(P_{TX,Max,b}, P_{TX,Target,b})$.

Depending on a radio and power amplifier design, maximum transmit power for each sub-band may be set differently.

In one example, a single transmit power amplifier is shared among the sub-bands. In such embodiment, a maximum transmit power for each sub-band can be split equally into each of the sub-bands.

In one example, a PA is separated for each sub-band with different sub-band bandwidth. In such embodiment, a maximum transmit power can be specified for each sub-band along with the bandwidth.

Regarding power ramping, in reality, there is estimation error and channel variation due to path loss variation and shadow fading. To avoid miss detection due to measurement error, periodically, transmission occurs with large power. In subsequent transmissions, a transmission power is reduced sequentially. Power ramp down depends on a step size. In one example, the step size is determined as a fixed step size, a linearly increasing/decreasing step size, or a geometric step size.

Figure 6:
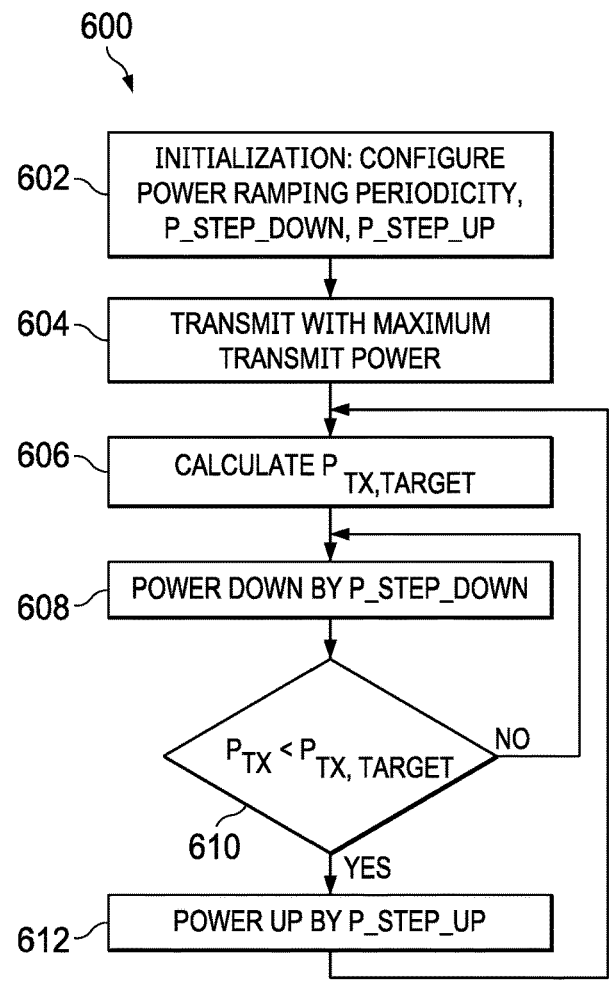
FIG. 6 illustrates a flow chart of a method for variable transmit power operation according to the present disclosure.

FIG. 6 illustrates a flow chart of a method 600 for variable transmit power operation according to the present disclosure. The embodiment of the method 600 illustrated in FIG. 6 is for illustration only. FIG. 6 does not limit the scope of this disclosure to any particular implementation.

As illustrated in FIG. 6, the method 600 begins at step 602. The method 600 as illustrated in FIG. 6 may be performed by a UE (111-116 as illustrated in FIG. 1) and/or a base station (101-103 as illustrated in FIG. 1) where the UE and BS (e.g., gNB) may employ the radar system as illustrated in FIGS. 4 and 5. Further, a stand alone radar system as illustrated in FIGS. 4 and 5 may perform the method 600 as illustrated in FIG. 6.

In step 602, the periodicity is configured for ramping up transmit power T_Ramp_Up_Periodicity, power ramp step sizes P_Step_Down and P_Step_Up. In step 604, at the beginning of transmission, transmission is performed at maximum transmit power. In step 606, a power control algorithm calculates a target transmit power level. In step 608, in a sub-sequent transmission, ramp down power by a configured step size P_Step_Down until the power reaches the target transmit power level. In step 610, the method determines whether if PTx,<PTx, Target. In step 610, if yes, the method 600 increases the transmit power by configured step size P_Step_Up in step 612. In step 610, if no, the method 600 performs step 608.

In one embodiment, the aforementioned steps 602, 604, and 606 are repeated. In one embodiment, steps 606 and 608 can be modified to keep the constant transmit power level for periodic power step up.

In one example, a power control algorithm calculates a target transmit power level. In such example, in a subsequent transmission, ramp down power by configured step size P_Step_Down until the power reaches the target transmit power level. If the power reaches PTx, Target, the method 600 keeps the transmission power level to PTx, Target.

In one example if a time reaches a transmit power ramp up period, the method 600 increases a transmit power by P_Step_Up.

Figure 7:
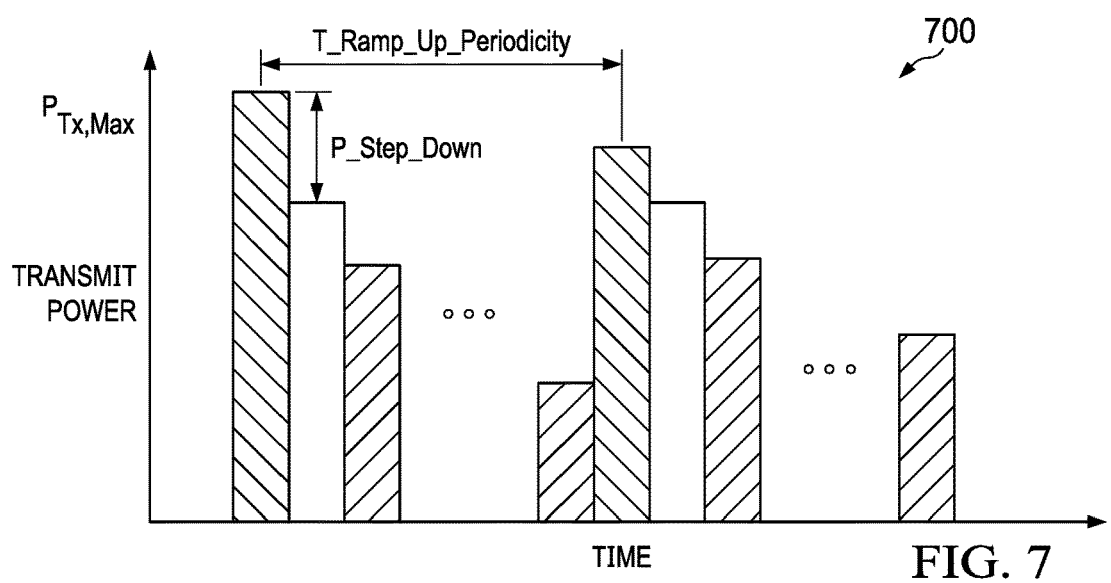
FIG. 7 illustrates an example transmit power with power ramping according to embodiment of the present disclosure.

FIG. 7 illustrates an example transmit power with power ramping 700 according to embodiment of the present disclosure. The embodiment of the transmit power with power ramping 700 illustrated in FIG. 7 is for illustration only. FIG. 7 does not limit the scope of this disclosure to any particular implementation.

As illustrated in FIG. 7, parameters are configured and power is adjusted according to a power ramping scheme according to embodiment of the present disclosure.

In one embodiment of an idle mode operation, a power saving mode is enabled by blanking signals at different granularity. Depending on whether signal is present in a symbol or not, there may be two types of blank transmissions.

In one embodiment of blank transmission scheme, in a time domain, a subset of symbols, slots, and sub-frames are blanked depending on use cases and blanking is done by a sub-sampling, or reducing a duration of active signal in a slot/sub-frame. In one example, in a spatial domain, a number of scans are reduced while using a wide beam-width; and in a receiver, a receiver processing for range/Doppler processing and beamforming can be turned off or left idle state, fully or partially, and processing for noise and measurement can still be turned on.

In one embodiment of a partially blank transmission scheme, in a frequency domain, one or more sub-channels are blanked, and codes (i.e., sequences identified with unique codes) are mapped to non-blank sub-channels selected for transmission, while other sub-channels are left blank.), and in a receiver, a signal reception and decoding for blank sub-channels can be left idle state, and in sub-channel and multi-channel transmission architecture, a sub-channel receiver processing for blank sub-channels can be turned off or left idle state, fully or partially, as shown in TABLE 1 and TABLE 2.

TABLE 1 shows low power modes. TABLE 2 shows low power operations.

TABLE 1

Low power modes

| Blanking Mode | Pattern | Explanation |
| --- | --- | --- |
| Symbol Blanking | On/Off | Blanking of subset of symbols |
| Slot Blanking | On/Off | Blanking of subset of slots |
| Sub-frame Duration | Sparse sub-sampling Reduce number of active slots in a sub-frame | Reduce length of active sub-frame duration |
| Sparse Beam | Reduce number of beams | Reduce scan rate with wide beam width |
| Sub-channel Blanking | On/Off sub-channel(s) | Turn off part of frequency sub-channels |
| Sub-carrier Blanking | On/Off sub-carrier | Large sub-carrier spacing |

TABLE 2

Low power operation

| Use Case | Sleep Mode | Example |
| --- | --- | --- |
| Range reduction | Symbol Blanking | Target range smaller than maximum system range |
| Range gating | Symbol Blanking | Target range is subset of maximum system range |
| Range resolution reduction | Sub-carrier Blanking | Reduced range resolution |
| MIMO operation | Symbol Blanking | For higher order MIMO operation, reduce the number of active symbols |
| Multi-beam operation | Symbol Blanking | For multi-stream beamforming operation, reduce the number of active symbols |
| Lower spatial sampling | Sparse Beam | Lower spatial resolution with wider beamwidth |
| Narrowband measurement | Sub-channel blanking | Narrowband interference & noise measurement |
| Interference avoidance | Sub-channel blanking | Narrowband interference avoidance |

TABLE 3 shows system parameters for a normal mode and a power saving mode operation.

TABLE 1

System parameters for a normal mode and a power saving mode operation

| Parameter | Value-Normal Operation | Value-Power Saving Mode |
|---|---|---|
| Symbol duration | 2□s | Target range is subset of maximum system range |
| Guard time | 2□s | Reduced range resolution |
| Slot configuration | [1 1 1 1 1 1 1 1] All symbols active transmission/reception in a slot | Symbols on/off in a Slot [1 1 1 1 0 0 0 0], [1 0 1 0 1 0 1 0] |
| Number of symbols in a slot | 8 | 4, 2, 1 |
| Number of slots in a sub-frame | 256 | 128, 64, 32, . . . |
| Sub-frame configuration | [1 1 . . . 1] | Turn of select slots in a sub-frame: [1 0 1 0 . . . 1 0] [111 . . . 11000 . . . 0] |
| Sub-channel configuration | [1 1 . . . 1] | Turn off select sub-channels [0 1 1 1] [1 0 1 1][1 1 0 1][1 1 1 0] |

In one embodiment, interference measurement in measurement sub-channel (slot/sub-band) per beam or antenna port is provided. In one embodiment, noise floor measurement is provided.

In one embodiment, there may be two types of interferences. In one example, a correlated interference with different velocity (e.g., subtract) is provided. In one example, an uncorrelated noise plus interference (e.g., open loop power control) is provided.

In one embodiment, a measurement gap created by blanking a subset of frames, sub-frames, slots, symbols, sub-channels and beams for measurement purposes is provided. During the measurement gap, either a transmitter is completely idle, or a portion of signal (except in selected sub-channels) is idle.

In one embodiment, the measurement gap is configured for periodic or aperiodic measurements.

In one embodiment of periodic measurement, a frame, a sub-frame, a slot, a symbol, a sub-channel and/or beam number, for measurement, are provided. In such embodiment, periodicity and duration of the measurement gap are provided.

In one embodiment of aperiodic measurement, measurement can take place following a certain event, such as signal power or SINR falls or exceeds below a certain threshold. When a condition is satisfied, a blank or partially blank transmission takes place.

Figure 8:
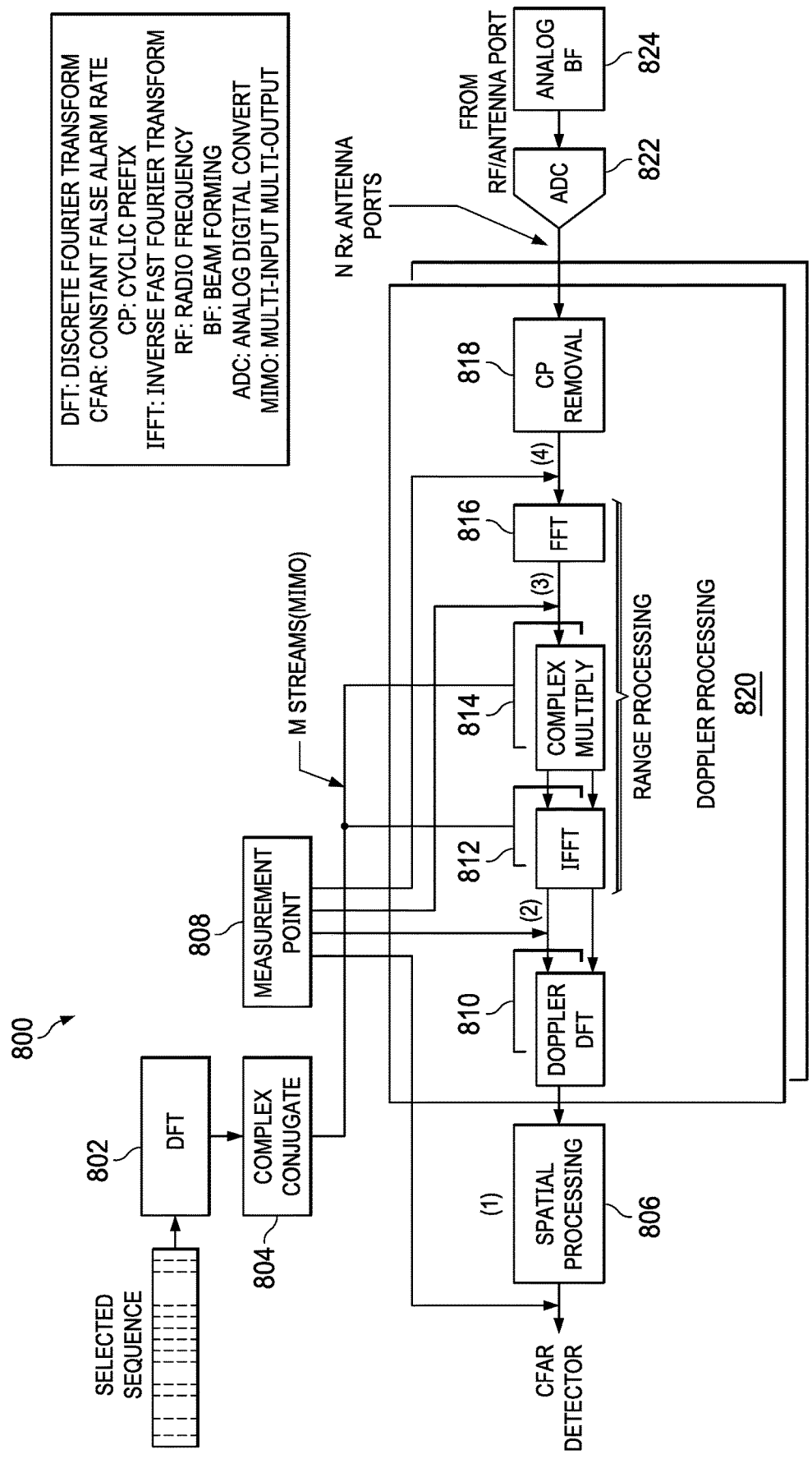
FIG. 8 illustrates an example reference point for measurement according to embodiment of the present disclosure.

A receiver processing for measurement is shown in FIG. 8. Possible reference point for measurement is shown in FIG. 8 depending on the application.

FIG. 8 illustrates an example reference point for measurement 800 according to embodiment of the present disclosure. The embodiment of the reference point for measurement 800 illustrated in FIG. 8 is for illustration only. FIG. 8 does not limit the scope of this disclosure to any particular implementation.

As illustrated in FIG. 8, the reference point for measurement 800 includes a discrete Fourier transform (DFT) 802 block, a complex conjugate 804 block, a spatial processing block 806, a measurement point block 808, a Doppler DFT block 810, an inverse fast Fourier transform (IFFT) block 812, a complex multiply block 814, a FFT block 816, a cyclic prefix (CP) removal block 818, an analog-to-digital convert (ADC) block 822, and an analog beam forming (BF) block 824. The The Doppler DFT block 810, the IFFT block, the complex multiply block 814, the FFT block 816, and the CP removal block 818 are configured to perform a Doppler processing and a range processing in a processing block 820. The processing block 820 may be implemented in parallel.

As illustrated in FIG. 8, a noise (plus interference) power is estimated from samples of the configured blank symbols, slots, or sub-frames.

In one embodiment, post-processing noise power is estimated after range processing (e.g., including 814, 816, and 818 as illustrated in FIG. 8), at the output of IFFT, corresponding to the measurement point (2) between the Doppler DFT 810 and the IFFT 812 as illustrated in FIG. 8. Average post-processing noise power is calculated by summing the power over the range window and by dividing the number of range bins.

In one embodiment, maximum-likelihood estimation and minimum-variance estimation approaches can be used to come up with average noise power estimation. Equivalent pre-processing noise power $\sigma_{N,Pre}^2$ is estimated by scaling the post-processing noise power by a processing gain as given by:

$$\sigma_{N,Pre}^2 = \frac{\text{Average Post Processing Noise Power}}{PG}.$$

Figures 9, 10, 13:
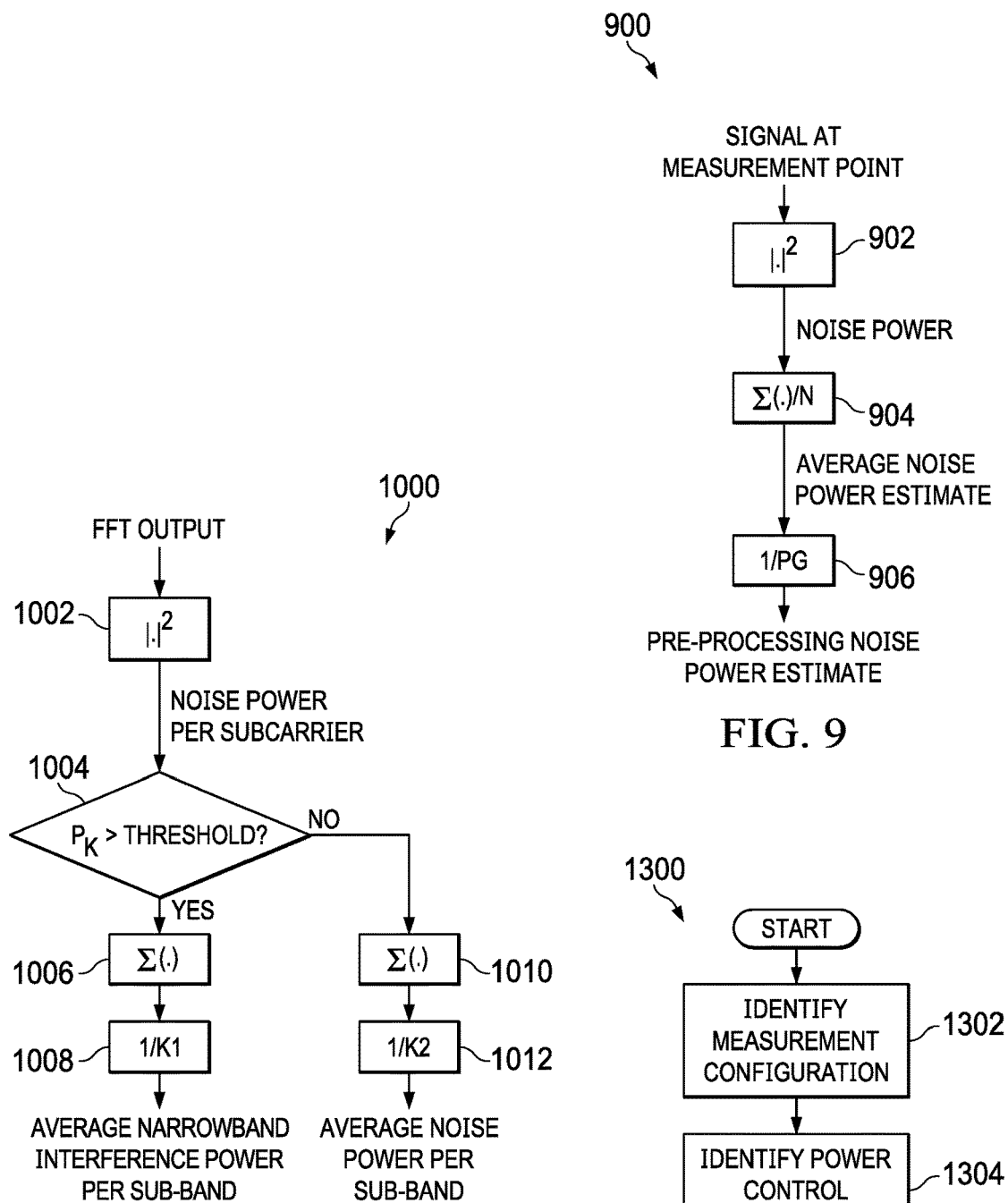
FIG. 9 illustrate a flow chart of a method for wideband noise estimation according to embodiments of the present disclosure.
FIG. 10 illustrates a flow chart of a method for sub-band noise plus interference estimation according to embodiments of the present disclosure.
FIG. 13 illustrates a flow chart of a method for power saving for radar according to embodiments of the present disclosure.

FIG. 9 illustrate a flow chart of a method 900 for wideband noise estimation according to embodiments of the present disclosure. The embodiment of method 900 illustrated in FIG. 9 is for illustration only. FIG. 9 does not limit the scope of this disclosure to any particular implementation.

As illustrated in FIG. 9, the power estimate can be used for setting the transmit power according to a power control algorithm.

As illustrated in FIG. 9, the method 900 begins at step 902. The method 900 as illustrated in FIG. 9 may be performed by a UE (111-116 as illustrated in FIG. 1) and/or a base station (101-103 as illustrated in FIG. 1) where the UE and BS (e.g., gNB) may employ the radar system as illustrated in FIGS. 4 and 5. Further, a stand-alone radar system as illustrated in FIGS. 4 and 5 may perform the method 900 as illustrated in FIG. 9.

As illustrated in FIG. 9, the method 900 begins at step 902. In step 902, the method 900 generates a noise power based on a signal at a measurement point. In step 904, the method 900 estimates an average noise power based on the noise power. In step 906, the method 900 estimates preprocessing noise power.

As illustrated in FIG. 9, sub-band noise power can be estimated by estimating the power spectral density for configured blank sub-bands. The measurement point is at the output of FFT, denoted as (3) between the complex multiply block 814 and the FFT block 816 as illustrated in FIG. 8. A bandwidth of sub-band depends on configuration and the configured waveform.

The noise includes thermal noise, wideband interference, and narrowband interference such as a frequency modulated continuous wave (FMCW) or chirp radar interference and FM jammer.

In the present disclosure, thermal noise, wideband interference, and narrowband interference such as FMCW or Chirp radar interference and FM jammer are collectively considered as "noise" and "narrowband interference," respectively.

To distinguish between the noise and the narrowband interference, a threshold may be applied. A CFAR threshold scaled to the measurement point can be applied. Signal above a threshold is narrowband interference, while signal below the threshold is noise.

FIG. 10 illustrates a flow chart of a method 1000 for sub-band noise plus interference estimation according to embodiments of the present disclosure. The embodiment of the method 1000 illustrated in FIG. 10 is for illustration only. FIG. 10 does not limit the scope of this disclosure to any particular implementation.

As illustrated in FIG. 10, the method 1000 begins at step 1002. The method 1000 as illustrated in FIG. 10 may be performed by a UE (111-116 as illustrated in FIG. 1) and/or a base station (101-103 as illustrated in FIG. 1) where the UE and BS (e.g., gNB) may employ the radar system as illustrated in FIGS. 4 and 5. Further, a stand-alone radar system as illustrated in FIG. 4 and FIG. 5 may perform the method 1000 as illustrated in FIG. 10.

As illustrated in FIG. 10, the method 1000 begins at step 1002. In step 1002, the method 1000 generates a noise power per subcarrier. In step 1004, the method 1000 determines whether a power is greater than a threshold. In step 1004, if the power exceeds the threshold, the method 1000 performs step 1006 and step 1008. Through step 1006 and step 1008, the method 1000 generates an average narrowband interference power per sub-band. In step 1004, if the power does not exceed the threshold, the method 1000 performs step 1010 and 1012. Through step 1010 and step 1012, the method 1000 generates an average noise power per sub-band.

When a V2V communication is set up, a propagation loss to a vehicle with established communication is available between two vehicles in a coverage area. Also, an SIR target for the traffic channel is available for target data rate.

Transmit power for a radar signal can be enhanced by using path loss information between the neighboring radars. For a system with many neighboring radars, infrastructure such as an intelligent transportation system or smart city infrastructure can find the two vehicles that are apart by a radar target distance. Infrastructure configures the radars with the sequence allocation and the measurement gap. From the information provided, a radar receiver can detect and estimate the radar signal from adjacent vehicles.

Figure 11:
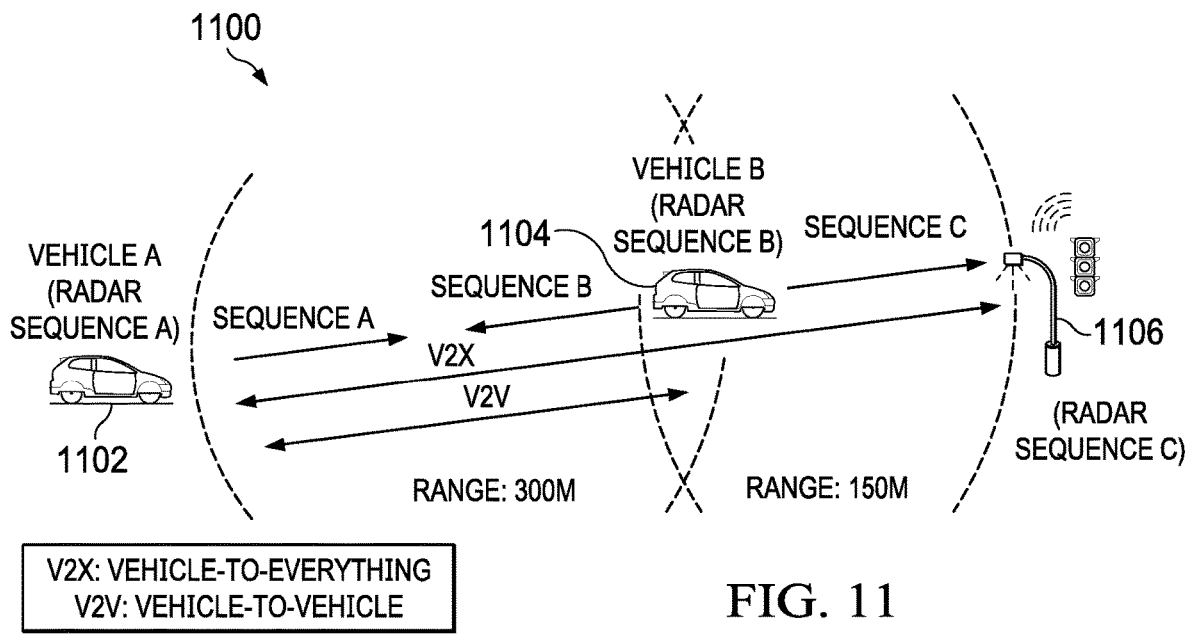
FIG. 11 illustrates an example radar power control aided by V2X according to embodiment of the present disclosure.

FIG. 11 illustrates an example radar power control 1100 aided by V2X according to embodiment of the present disclosure. The embodiment of the radar power control 1100 illustrated in FIG. 11 is for illustration only. FIG. 11 does not limit the scope of this disclosure to any particular implementation.

FIG. 11 illustrates a V2X aided power control scenario between vehicle A emitting a radar sequence A and vehicle B emitting a radar sequence B. The vehicle B is near a radar target distance for the vehicle A. As illustrated in FIG. 11, the radar power control 1100 includes a vehicle A 1102, a vehicle B 1104, and a signal lamp (e.g., traffic light or smart pole) 1106.

As illustrated in FIG. 11, the vehicle A 1102 radar is allocated to the sequence A through infrastructure connected by V2X. A vehicle B 1104 radar is allocated to the sequence B through infrastructure connected by V2X. The signal lamp 1106 is allocated to a radar sequence C.

A V2X allocates measurement interval for a vehicle A 1102 radar to detect neighboring radar signal. The vehicle A 1102 is informed about the vehicle B's sequence ID, configurations, and a transmit power. The vehicle B 1104 transmits radar signal with the sequence B. The vehicle A 1102 runs a receiver processing for the sequence B and detects range and Doppler.

From detecting the vehicle B's radar signal, the vehicle A 1102 estimates the path loss between the vehicle A 1102 and the vehicle B 1104. For, the vehicle A 1102, a path loss is estimated for targeted distance and transmit power is set using path loss information.

As illustrated in FIG. 11, the radar sequence C emitted from the signal lamp 1106 to the vehicle B 1104 may be ranged in about 150 meters, and the radar sequence A emitted from the vehicle A 1102 and the radar sequence B emitted from the vehicle B may be ranged in about 300 meters.

For two vehicles (e.g., 1102 and 1104 as illustrated in FIG. 11) that have an on-going V2V communication, configurable power offset can be defined relative to the traffic channel SIR target. For multiple targets with V2V connectivity, radar transmit power is calculated from the maximum target SIR for all the targets within the targeted range.

Figure 12:
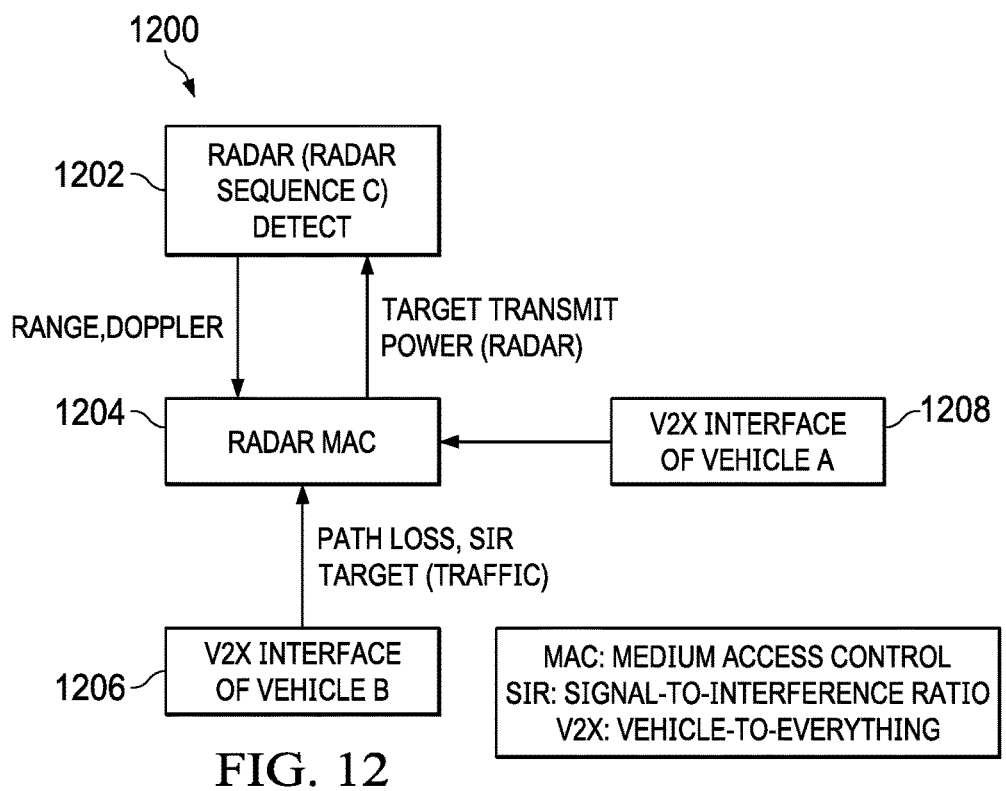
FIG. 12 illustrates an example system architecture of radar power control aided by V2X according to embodiments of the present disclosure.

FIG. 12 illustrates an example system architecture 1200 of radar power control aided by V2X according to embodiments of the present disclosure, as may be implemented in a vehicle. The embodiment of the system architecture 1200 illustrated in FIG. 12 is for illustration only. FIG. 12 does not limit the scope of this disclosure to any particular implementation.

FIG. 12 illustrates the architecture and interface of V2X aided power control. As illustrated in FIG. 12, the system architecture 1200 includes a radar (e.g., radar circuit and/or system) 1202, a radar MAC 1204, and a V2X interface (e.g., V2X circuit and/or system) of vehicle B 1206, and a V2X interface of vehicle A 1208.

As illustrated in FIG. 12, the radar 1202 includes a radar sequence C emitted from the signal lamp 1106 as illustrated in FIG. 11, FIG. 13 illustrates a flow chart of a method 1300 for power saving for a radar according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. The method 1300 as illustrated in FIG. 13 may be performed by a UE (111-116 as illustrated in FIG. 1) and/or a base station (101-103 as illustrated in FIG. 1) where the UE and BS (e.g., gNB) may employ the radar system as illustrated in FIGS. 4 and 5. Further, a stand-alone radar system as illustrated in FIG. 4 and FIG. 5 may perform the method 1300 as illustrated in FIG. 13. In addition, a vehicle for V2X communication, including a radar system as illustrated in FIG. 11 and FIG. 12 may perform the method 1300 as illustrated in FIG. 13.

As illustrated in FIG. 13, the method 1300 begins at step 1302. In step 1302, the method 1300, in response to reporting a device capability including a maximum power and a power back off, identifies a measurement configuration including a measurement gap, a set of parameters, and a sub-band structure.

Subsequently, in step 1304, the method 1300 identifies, based on the measurement configuration, a power control configuration for a radar circuit.

In one embodiment, the power control mode is determined as at least one of one-time control mode, a periodic control mode, or a pre-determined time period control mode.

Next, in step 1306, the method 1300 identifies, based on a measurement report corresponding to the power control configuration, a power control mode including at least one of a normal mode, a low power mode, or an idle mode.

Finally, in step 1308, the method 1300 transmits a first signal at a transmit power that is determined based on the measurement report and the power control mode.

In one embodiment, the method transmits the first signal, in the normal mode, at a constant power based on a corresponding transmit power; transmits the first signal, in the low power mode, at a power less than a peak power of the transmit power based on at least one of a maximum power range, estimate of path loss, measurement of noise and interference, or a targeted signal-to-noise ratio; or transmits the first signal in the idle mode where the first signal is blanked based on a pre-configuration comprising at least one of symbols, slots, sub-carriers, or beam, the idle mode comprising a blank transmission mode or partially blank transmission mode.

In one embodiment, the method 1300 identifies a set of waveform parameters, a set of blank formats, and power management based on interference management, and a scheduling and measurement configuration; generates, based on a radar waveform, an in-phase and quadrature components for the first signal to be transmitted to an object; and receives a second signal including the in-phase and quadrature components, the second signal being reflected from the object.

In one embodiment, the method 1300 identifies the transmit power based on at least one of a maximum path loss, a radar maximum transmit power, a target signal-to-interference plus noise ratio (SINR), or a level of noise, the transmit power being configured statically, semi-statically, or dynamically based on the power control mode comprising a wideband power control mode or a sub-band power control mode.

In one embodiment, the method 1300 transmits, at the transmit power, the first signal over an entire bandwidth in a wideband power control mode; or transmits, at the transmit power, the first signal over each sub-band of the entire bandwidth in a sub-band power control mode.

In one embodiment, the method 1300 performs a first power ramping to reduce the transmit power by a first size of pre-configured step for a subsequent transmission. In such embodiment, the transmit power is initially set to a maximum transmit power at the radar circuit.

In one embodiment, the method 1300 performs a second power ramping to further reduce the reduced transmit power by a second size of pre-configured step when the reduced transmit power that is reduced by the first power ramping reaches a minimum transmit power at the radar circuit.

In one embodiment, the method 1300 generates the measurement gap using a blanking set of resources including a set of frames, a set of sub-frames, a set of slots, a set of sub-channels, and a set of beams that are used for measurement. In such embodiment, the measurement gap is configured based on at least one of: a periodic or aperiodic measurement configuration; an event-based measurement; one or more measurement reference points; a noise variance calculated from the one or more measurement reference points; a wideband measurement; or a sub-band measurement.

In one embodiment, the method 1300 identifies at least one signal received, over a channel, from at least one portable electronic device, the channel associated with the at least one portable electronic device; determines whether to transmit the first signal based on the identified at least one signal; identifies the power offset based on the determination of the first signal and the transmit power; and transmits the first signal, wherein the transmit power is determined based on the power offset and at least one portable electronic device target SINR of the at least one portable electronic device, or transmits, to the at least one portable electronic device over the channel, the first signal, the transmit power being determined based on the power offset and the at least one portable electronic device target SINR of the at least one portable electronic device.

In one example embodiment, an apparatus or method of an advanced wireless system includes a radar circuit including a set of transmit antennas and a set of receive antennas; and a controller operably connected to the radar circuit, including a medium access control (MAC) controller and a configuration circuit. The controller is configured to, in response to reporting a device capability including a maximum power and a power back off, identify a measurement configuration including a measurement gap, a set of parameters, and a sub-band structure; identify, based on the measurement configuration, a power control configuration for the radar circuit; and identify, based on a measurement report corresponding to the power control configuration, a power control mode including at least one of a normal mode, a low power mode, or an idle mode, wherein the radar circuit is configured to transmit a first signal at a transmit power that is determined based on the measurement report and the power control mode.

In the above example embodiment, the power control mode is determined as at least one of one-time control mode, a periodic control mode, or a pre-determined time period control mode.

In any of the above example embodiments, the radar circuit is further configured to: transmits the first signal, in the normal mode, at a constant power based on a corresponding transmit power; transmit the first signal, in the low power mode, at a power less than a peak power of the transmit power based on at least one of a maximum power range, estimate of path loss, measurement of noise and interference, or a targeted signal-to-noise ratio; or transmit the first signal in the idle mode where the first signal is blanked based on a pre-configuration comprising at least one of symbols, slots, sub-carriers, or beam, the idle mode comprising a blank transmission mode or partially blank transmission mode.

In any of the above example embodiments, the MAC controller included in the controller is configured to identify a set of waveform parameters, a set of blank formats, and power management based on interference management, and a scheduling and measurement configuration; and the radar circuit is further configured to: generate, based on a radar waveform, an in-phase and quadrature components for the first signal to be transmitted to an object; and receive a second signal including the in-phase and quadrature components, the second signal being reflected from the object.

In any of the above example embodiments, the controller is further configured to identify the transmit power based on at least one of a maximum path loss, a radar maximum transmit power, a target signal-to-interference plus noise ratio (SINR), or a level of noise, the transmit power being configured statically, semi-statically, or dynamically based on the power control mode comprising a wideband power control mode or a sub-band power control mode.

In any of the above example embodiments, the radar circuit is further configured to: transmit, at the transmit power, the first signal over an entire bandwidth in a wideband power control mode; or transmit, at the transmit power, the first signal over each sub-band of the entire bandwidth in a sub-band power control mode.

In any of the above example embodiments, the radar circuit is further configured to perform a first power ramping to reduce the transmit power by a first size of pre-configured step for a subsequent transmission, and wherein the transmit power is initially set to a maximum transmit power at the radar circuit.

In any of the above example embodiments, the radar circuit is further configured to perform a second power ramping to further reduce the reduced transmit power by a second size of pre-configured step when the reduced transmit power reaches a minimum transmit power at the radar circuit.

In any of the above example embodiments, the controller is further configured to generate the measurement gap using a blanking set of resources including a set of frames, a set of sub-frames, a set of slots, a set of sub-channels, and a set of beams that are used for measurement; and the measurement gap is configured based on at least one of: a periodic or aperiodic measurement configuration; an event-based measurement; one or more measurement reference points; a noise variance calculated from the one or more measurement reference points; a wideband measurement; or a sub-band measurement.

In any of the above example embodiments, the controller is further configured to: identify at least one signal received, over a channel, from at least one portable electronic device, the channel associated with the at least one portable electronic device, determine whether to transmit the first signal based on the identified at least one signal, identify the power offset based on the determination of the first signal and the transmit power, and the radar circuit is further configured to: transmit the first signal, wherein the transmit power is determined based on the power offset and at least one portable electronic device target SINR of the at least one portable electronic device, or transmit, to the at least one portable electronic device over the channel, the first signal, the transmit power being determined based on the power offset and the at least one portable electronic device target SINR of the at least one portable electronic device.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus of an advanced wireless system, the apparatus comprises:
   a radar circuit including a set of transmit antennas and a set of receive antennas; and
   a controller operably connected to the radar circuit, including a medium access control (MAC) controller performing a scheduling operation and interference management and a configuration circuit, the controller configured to:
   in response to reporting a device capability including a maximum power and a power back off, identify a measurement configuration including a measurement gap, a set of parameters, and a sub-band structure;
   identify, based on the measurement configuration, a power control configuration for the radar circuit; and
   identify, based on a measurement report corresponding to the power control configuration, a power control mode including at least one of a normal mode, a low power mode, or an idle mode,
   wherein:
   the MAC controller is further configured to identify a set of waveform parameters, a set of blank formats, and power management based on the interference management, and a scheduling and measurement configuration using the scheduling operation; and
   the radar circuit is configured to:
   transmit a first signal at a transmit power that is determined based on the measurement report and the power control mode comprising a wideband power control mode and a sub-band power control mode, the first signal being transmitted, based on the transmit power, over the wideband power control mode or the sub-band power control mode;
   receive a second signal corresponding to the first signal, the second signal including in-phase and quadrature components for the first signal, the in-phase and quadrature components, for the first signal to be transmitted to an object, being generated based on a radar waveform; and
   receive the second signal being reflected from the object.

2. The apparatus of claim 1, wherein the power control mode is determined as at least one of one-time control mode, a periodic control mode, or a pre-determined time period control mode.

3. The apparatus of claim 1, wherein the radar circuit is further configured to:

transmit the first signal, in the normal mode, at a constant power based on a corresponding transmit power;

transmit the first signal, in the low power mode, at a power less than a peak power of the transmit power based on at least one of a maximum power range, estimate of path loss, measurement of noise and interference, or a targeted signal-to-noise ratio; or transmit the first signal in the idle mode where the first signal is blanked based on a pre-configuration comprising at least one of symbols, slots, sub-carriers, or beam, the idle mode comprising a blank transmission mode or partially blank transmission mode.

4. The apparatus of claim 1, wherein the controller is further configured to identify the transmit power based on at least one of a maximum path loss, a radar maximum transmit power, a target signal-to-interference plus noise ratio (SINR), or a level of noise, the transmit power being configured statically, semi-statically, or dynamically based on the power control mode comprising a wideband power control mode or a sub-band power control mode.

5. The apparatus of claim 1, wherein the radar circuit is further configured to:
    transmit, at the transmit power, the first signal over an entire bandwidth in the wideband power control mode; or
    transmit, at the transmit power, the first signal over each sub-band of the entire bandwidth in the sub-band power control mode.

6. The apparatus of claim 1, wherein the radar circuit is further configured to perform a first power ramping to reduce the transmit power by a first size of pre-configured step for a subsequent transmission, and wherein the transmit power is initially set to a maximum transmit power at the radar circuit.

7. The apparatus of claim 6, wherein the radar circuit is further configured to perform a second power ramping to adjust the reduced transmit power by a second size of pre-configured step when the reduced transmit power reaches a minimum transmit power at the radar circuit.

8. The apparatus of claim 1, wherein:
    the controller is further configured to generate the measurement gap using a blanking set of resources including a set of frames, a set of sub-frames, a set of slots, a set of sub-channels, and a set of beams that are used for measurement; and
    the measurement gap is configured based on at least one of:
        a periodic or aperiodic measurement configuration;
        an event-based measurement;
        one or more measurement reference points;
        a noise variance calculated from the one or more measurement reference points;
        a wideband measurement; or
        a sub-band measurement.

9. The apparatus of claim 1, wherein:
    the controller is further configured to:
        identify at least one signal received, over a channel, from at least one portable electronic device, the channel associated with the at least one portable electronic device,
        determine whether to transmit the first signal based on the identified at least one signal,
        identify a power offset based on the determination of the first signal and the transmit power; and
    the radar circuit is further configured to:
        transmit the first signal, wherein the transmit power is determined based on the power offset and at least one portable electronic device target SINR of the at least one portable electronic device, or
        transmit, to the at least one portable electronic device over the channel, the first signal, the transmit power being determined based on the power offset and the at least one portable electronic device target SINR of the at least one portable electronic device.

10. A method of an advanced wireless system, the method comprises:
    in response to reporting a device capability including a maximum power and a power back off, identifying a measurement configuration including a measurement gap, a set of parameters, and a sub-band structure;
    identifying, based on the measurement configuration, a power control configuration for a radar circuit connected to a medium access control (MAC) controller performing a scheduling operation and interference management;
    identifying, based on a measurement report corresponding to the power control configuration, a power control mode including at least one of a normal mode, a low power mode, or an idle mode;
    identifying a set of waveform parameters, a set of blank formats, and power management based on the interference management, and a scheduling and measurement configuration using the scheduling operation;
    transmitting a first signal at a transmit power that is determined based on the measurement report and the power control mode comprising a wideband power control mode and a sub-band power control mode, the first signal being transmitted, based on the transmit power, over the wideband power control mode or the sub-band power control mode;
    receiving a second signal corresponding to the first signal, the second signal including in-phase and quadrature components for the first signal, wherein the in-phase and quadrature components, for the first signal to be transmitted to an object, are generated based on a radar waveform; and
    receiving the second signal being reflected from the object.

11. The method of claim 10, wherein the power control mode is determined as at least one of one-time control mode, a periodic control mode, or a pre-determined time period control mode.

12. The method of claim 10, further comprising:
    transmitting the first signal, in the normal mode, at a constant power based on a corresponding transmit power;
    transmitting the first signal, in the low power mode, at a power less than a peak power of the transmit power based on at least one of a maximum power range, estimate of path loss, measurement of noise and interference, or a targeted signal-to-noise ratio; or
    transmitting the first signal in the idle mode where the first signal is blanked based on a pre-configuration comprising at least one of symbols, slots, sub-carriers, or beam, the idle mode comprising a blank transmission mode or partially blank transmission mode.

13. The method of claim 10, further comprising identifying the transmit power based on at least one of a maximum path loss, a radar maximum transmit power, a target signal-to-interference plus noise ratio (SINR), or a level of noise, the transmit power being configured statically, semi-statically, or dynamically based on the power control mode comprising a wideband power control mode or a sub-band power control mode.

14. The method of claim 10, further comprising:
transmitting, at the transmit power, the first signal over an entire bandwidth in the wideband power control mode; or
transmitting, at the transmit power, the first signal over each sub-band of the entire bandwidth in the sub-band power control mode.

15. The method of claim 14, further comprising performing a first power ramping to reduce the transmit power by a first size of pre-configured step for a subsequent transmission, wherein the transmit power is initially set to a maximum transmit power at the radar circuit.

16. The method of claim 15, further comprising performing a second power ramping to adjust the reduced transmit power by a second size of pre-configured step when the reduced transmit power reaches a minimum transmit power at the radar circuit.

17. The method of claim 10, further comprising:
generating the measurement gap using a blanking set of resources including a set of frames, a set of sub-frames, a set of slots, a set of sub-channels, and a set of beams that are used for measurement,
wherein the measurement gap is configured based on at least one of:
a periodic or aperiodic measurement configuration;
an event-based measurement;
one or more measurement reference points;
a noise variance calculated from the one or more measurement reference points;
a wideband measurement; or
a sub-band measurement.

18. The method of claim 10, further comprising:
identifying at least one signal received, over a channel, from at least one portable electronic device, the channel associated with the at least one portable electronic device;
determining whether to transmit the first signal based on the identified at least one signal;
identifying a power offset based on the determination of the first signal and the transmit power; and
transmitting the first signal, wherein the transmit power is determined based on the power offset and at least one portable electronic device target SINR of the at least one portable electronic device, or
transmitting, to the at least one portable electronic device over the channel, the first signal, the transmit power being determined based on the power offset and the at least one portable electronic device target SINR of the at least one portable electronic device.

\* \* \* \* \*